United States Patent
Booz et al.

(10) Patent No.: US 8,209,262 B2
(45) Date of Patent: Jun. 26, 2012

(54) PATTERN-BASED POLICY APPLICATION MECHANISM FOR SCA

(75) Inventors: David A. Booz, Rhinebeck, NY (US); Francisco P. Curbera, Hastings on Hudson, NY (US); Shinichi Hirose, Tokyo (JP); Nirmal K. Mukhi, Ramsey, NJ (US); Yuichi Nakamura, Tokyo (JP); Fumiko Satoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 12/167,819

(22) Filed: Jul. 3, 2008

(65) Prior Publication Data

US 2010/0004968 A1 Jan. 7, 2010

(51) Int. Cl.
*G06F 21/00* (2006.01)
*G06F 3/00* (2006.01)

(52) U.S. Cl. .............. 705/59; 719/318; 719/331
(58) Field of Classification Search .......... 705/59
See application file for complete search history.

(56) References Cited

U.S. PATENT DOCUMENTS

| | | | |
|---|---|---|---|
| 6,721,777 B1* | 4/2004 | Sharma ................ | 718/101 |
| 7,080,092 B2* | 7/2006 | Upton ................... | 1/1 |
| 2003/0074217 A1* | 4/2003 | Beisiegel et al. ........ | 705/1 |
| 2003/0200357 A1 | 10/2003 | Yanosy | |
| 2004/0049509 A1* | 3/2004 | Keller et al. ............ | 707/100 |
| 2004/0177335 A1* | 9/2004 | Beisiegel et al. ........ | 717/102 |
| 2005/0033796 A1* | 2/2005 | Gilbert et al. .......... | 709/200 |
| 2005/0160434 A1* | 7/2005 | Tan et al. .............. | 719/331 |
| 2005/0198050 A1* | 9/2005 | Bivens et al. .......... | 707/100 |
| 2005/0240422 A1* | 10/2005 | Doyle et al. ........... | 705/1 |
| 2006/0095552 A1* | 5/2006 | Dini et al. ............. | 709/223 |
| 2006/0130038 A1* | 6/2006 | Claussen et al. ........ | 717/168 |
| 2006/0143144 A1 | 6/2006 | Speeter et al. | |
| 2006/0224424 A1 | 10/2006 | Khusial et al. | |
| 2006/0265719 A1* | 11/2006 | Astl et al. ............. | 719/328 |
| 2006/0288039 A1 | 12/2006 | Acevedo-Aviles et al. | |
| 2007/0006278 A1 | 1/2007 | Ioan Avram et al. | |
| 2007/0033640 A1* | 2/2007 | Herness et al. ......... | 726/5 |
| 2007/0156618 A1 | 7/2007 | Meurs | |
| 2007/0192706 A1 | 8/2007 | Bruce et al. | |
| 2007/0255769 A1* | 11/2007 | Agrawal et al. ........ | 707/205 |
| 2008/0046582 A1 | 2/2008 | Beisiegel et al. | |

(Continued)

OTHER PUBLICATIONS

"SCA Policy Framework: SCA Version 1.0", Mar. 2007, all pages, http://www.osoa.org/download/attachments/35/SCA_Policy_Framework_V100.pdf?version=1.*

(Continued)

*Primary Examiner* — Andrew J. Fischer
*Assistant Examiner* — Calvin Cheung
(74) *Attorney, Agent, or Firm* — Scully, Scott, Murphy & Presser; William Stock, Esq.

(57) ABSTRACT

A pattern-based policy method for service component architecture (SCA) defines a policy pattern for SCA. The policy pattern includes a plurality of roles and one or more constraints between said plurality of roles. Each of said plurality of roles defines a plurality of intents or policy sets or combination thereof. One or more roles assigned to said one or more SCA components are identified and one or more intents or policy sets or combination thereof associated with said one or more roles are automatically applied to said one or more SCA components. Said one or more intents or policy sets or combination thereof applied to said one or more SCA components are validated based on said one or more constraints.

24 Claims, 8 Drawing Sheets

U.S. PATENT DOCUMENTS

| | | | |
|---|---|---|---|
| 2008/0052503 A1 | 2/2008 | Beisiegel et al. | |
| 2008/0059633 A1* | 3/2008 | Hu | 709/225 |
| 2008/0091679 A1* | 4/2008 | Herness et al. | 707/8 |
| 2008/0301641 A1* | 12/2008 | Bojjireddy et al. | 717/121 |
| 2008/0312986 A1 | 12/2008 | Braun et al. | |
| 2009/0077615 A1* | 3/2009 | Chung et al. | 726/1 |
| 2010/0318966 A1* | 12/2010 | Oh et al. | 717/120 |

OTHER PUBLICATIONS

"Reference Model for Service Oriented Architecture 1.0", Oct. 12, 2006, OASIS, all pages, http://docs.oasis-open.org/soa-rm/v1.0/soa-rm.pdf.*

"SCA Service Component Architecture: Assembly Model Specification", Mar. 15, 2007, all pages http://www.osoa.org/download/attachments/35/SCA_AssemblyModel_V100.pdf.*

Armstrong et. al., The J2EE 1.4 Tutorial, Dec. 7, 2005, all pages, Suns Microsystems Inc., http://download.oracle.com/javaee/1.4/tutorial/doc/IntroXML2.html.*

"SCA Service Component Architecture: JMS Binding Specification", Mar. 21, 2007, www.osoa.org, all pages. http://www.osoa.org/download/attachments/35/SCA_JMSBinding_V100.pdf.*

"SCA Service Component Architecture: Java Common Annotations and APIs", Mar. 21, 2007, www.osoa.org, all pages. http://www.osoa.org/download/attachments/35/SCA_JavaAnnotationsAndAPIs_V100.pdf.*

Ruiz, Jose L. et al., A Service Component Deployment Architecture for e-Banking, 22nd International Conference on Advanced Information Networking and Applications—Workshops, 3rd International IEEE Workshop on Service Oriented Architectures in Converging Networked Environments (SOCNE 08), IEEE Computer Society, 2008, pp. 1369-1374.

Curbera, Francisco, Component Contracts in Service-Oriented Architectures, IEEE Computer Society, 2007, pp. 74-80.

Ying, Liu et al., An Intelligent Service Composer for Business-level Service Composition, The 9th IEEE International Conference on E-Commerce Technology and The 4th IEEE International Conference on Enterprise Computing, E-Commerce and E-Services (CEC-EEE 2007), The Computer Society, 2007.

Zou, Zhile et al., Building Business Processes or Assembling Service Components: Reuse Services with BPEL4WS and SCA, Proceedings of the European Conference in Web Services (ECOWS'06) The Computer Society, 2006.

Sanz, Jorge L., et al., Business Services and Business Componentization: New Gaps Between Business and IT, IEEE International Conference on Service-Oriented Computing and Applications (SOCA'07), The Computer Society, 2007.

Gannon, D., et al., Building Grid Portal Applications From a Web Service Component Architecture, Proceedings of the IEEE, Mar. 2005, pp. 551-563, vol. 93, No. 3.

U.S. Official Action mailed Nov. 22, 2011 in related U.S. Appl. No. 12/167,848.

* cited by examiner

```xml
<?xml version = "1.0" encoding = "ASCII"?>
<!-- MyValueComposite_1 example -->
<composite xmlns ="http://www.osoa.org/xmlns/sca/1.0"
    targetNamespace="http://foo.com" name="MyValueComposite" requires = "confidentiality" >   — 202

<service name ="MyValueService promote" ="MyValueServiceComponent">

<component name="MyValueServiceComponent">                                                — 204
    <implementation.java class ="services.myvalue.MyValueServiceImpl"/>
    <property name ="currency">EURO</property>
    <reference name ="customerService" requires= "confidentiality.message, integrity"/>
    <reference name = "stockQuoteService"/>
    </component>

<reference
        name="CustomerService" promote="MyValueServiceComponent/customerService"/>
    <reference
        name ="StockQuoteService" promote ="MyValueServiceComponent/stockQuoteService"/>

</composite>
```

FIG. 2

PATTERN-BASED POLICY APPLICATION MECHANISM FOR SCA

CROSS-RELATED APPLICATIONS

This application is related to co-pending patent application Ser. No. 12/167,848, entitled "POLICY APPLICATION RULES FOR AUTOMATED CONFIGURATION OF SOFTWARE COMPONENTS", filed herewith, the disclosure of which is herein incorporated by reference in its entirety.

FIELD OF THE INVENTION

The present application relates to policy configuration mechanisms, for example, for Service Component Architecture (SCA) in computer systems, and more particularly to a pattern-based policy application mechanism.

BACKGROUND OF THE INVENTION

Service Component Architecture (SCA) is a programming model for building applications and solutions based on a Service Oriented Architecture. SCA describes the content and linkage of an application in assemblies called composites. FIG. 1 is a diagram illustrating an example of SCA composite. SCA composites contain internal elements such as components 102, services 104, references 106, 108, shown in FIG. 1. SCA elements can have policies attached to them so that they exhibit desired non-functional properties, such as security and transactional properties. There are two kinds of SCA policies: policy intents and policySets. The policy intents are defined as keywords to describe the abstract policy requirements of SCA elements and/or requirements of interactions between components represented by services and references. Using intents, developers and assemblers can state these policy requirements in a high-level abstract form without the detailed configuration of the runtime and bindings. PolicySets can contain policies expressed in concrete form, such as WS-Policy assertions.

FIG. 2 is an XML representation for SCA composite. The SCA policy intents and policySets can be specified as "requires" attributes 202, 204 of SCA elements. Some domain-specific intents are defined in SCA policy specification as follows:

Security policy intents:
authentication
integrity
confidentiality
Transaction policy intents:
managedTransaction
noManagedTransaction
propagatesTransaction
suspendsTransaction
transactedOneWay In SCA policy specification, valid sets of intents are defined. For example, all security intents can be applied to a same element. As for transaction, "propagatesTransaction" and "noManagedTransaction" are defined as "incompatible intents". Also policy intents, which are applied to a component are inherited to the lower-level composite in case a component includes another composite. Users have to apply policy intents and policySets considering such restrictions and qualifications.

Open SOA proposed SCA policy representation as part of the SCA policy framework. Some domain-specific SCA policies are discussed, such as SCA security policy and SCA transaction policy. SCA policy framework defines security intents and policySets, and how to attach intents and policySets to a SCA composite. The SCA policy attachment mechanism is quite flexible, such that one can attach intents and policySets, e.g., specify abstract policies using intents such as "authentication" or "integrity" to any kinds of elements in a composite. However, there are some. In implementing the policy, users need to conform to those practices. It is also necessary to ensure all intents are consistent. Often, however, it is difficult to properly configure policy because a SCA composite structure can be complex, for example, it may have a recursive structure, intents have domain-specific constraints, etc.

BRIEF SUMMARY OF THE INVENTION

A method and system for pattern-based policy application for service component architecture (SCA) are provided. The method in one aspect may comprise defining a policy pattern for SCA. The policy pattern includes a plurality of roles and one or more constraints between the plurality of roles. Each of the plurality of roles defines a plurality of intents or policy sets or combination thereof. The method may also include identifying one or more roles assigned to said one or more SCA components, and applying automatically one or more intents or policy sets or combination thereof, associated with said one or more roles to said one or more SCA components. The method may further include validating said one or more intents or policy sets or combination thereof applied to said one or more SCA components based on said one or more constraints.

A method for pattern-based policy application for service component architecture (SCA), in another aspect, may comprise defining a policy pattern for SCA. The policy pattern may include a plurality of roles and one or more constraints between the plurality of roles. Each of the plurality of roles defines a plurality of intents or policy sets or combination thereof. The method may also include allowing a user to select a policy pattern to apply for a composite including one or more SCA policies, inferring one or more roles based on the policy pattern applied for said composite, and attaching said one or more roles to said one or more SCA components. The method may further include inferring one or more roles from said one or more constraints and applying automatically said inferred one or more roles, and validating said one or more intents or policy sets or combination thereof applied to said one or more SCA components based on said one or more constraints.

A system for pattern-based policy application for service component architecture (SCA), in one aspect, may comprise a processor; a computer-implemented module operable to define a policy pattern for SCA, the policy pattern including a plurality of roles and one or more constraints between the plurality of roles, each of the plurality of roles defining a plurality of intents or policy sets or combination thereof; a computer-implemented module operable to identify one or more roles assigned to said one or more SCA components; a computer-implemented module operable to apply automatically one or more intents or policy sets or combination thereof, associated with said one or more roles to said one or more SCA components; and a computer-implemented module operable to validate said one or more intents or policy sets or combination thereof applied to said one or more SCA components based on said one or more constraints.

A program storage device readable by a machine, tangibly embodying a program of instructions executable by the machine to perform above-described methods may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 is an XML representation for SCA composite.

DETAILED DESCRIPTION

Figure 1:
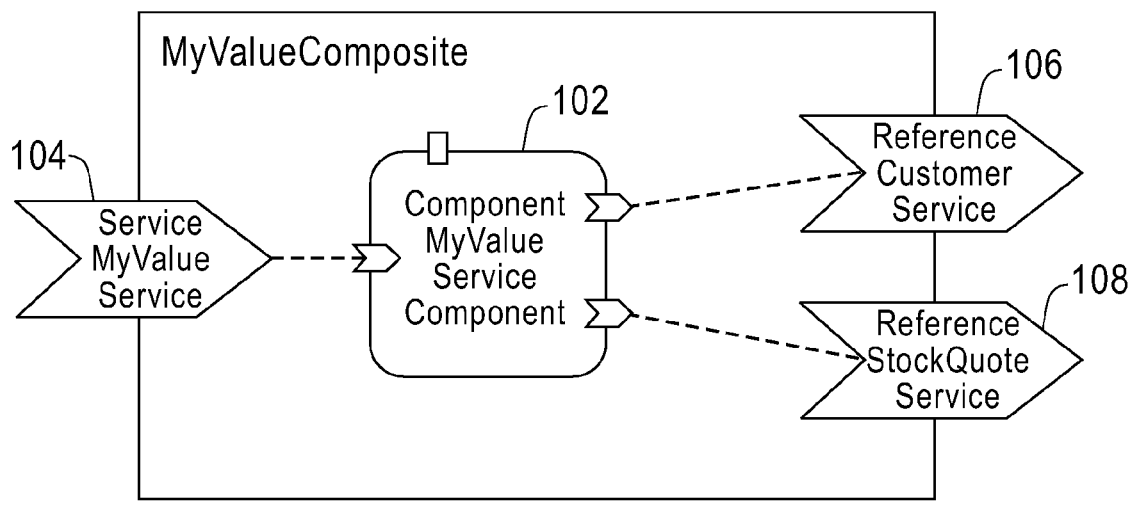
FIG. 1 is a diagram illustrating an example of SCA composite.
Figure 3:
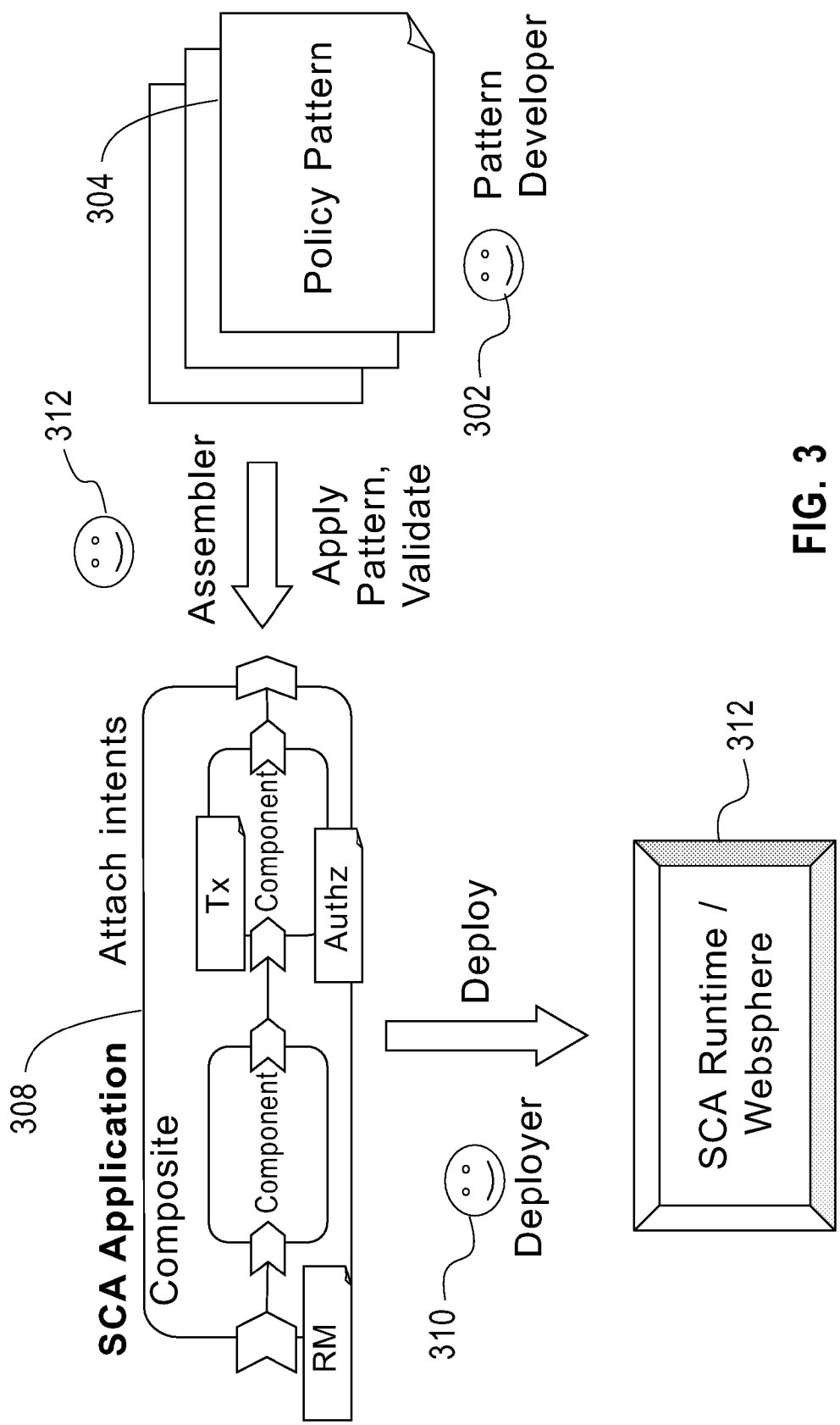
FIG. 3 shows architecture in one embodiment for SCA policy configuration.

A mechanism is provided for a SCA policy configuration. The pattern-based policy pattern application mechanism of the present disclosure simplifies the SCA policy configuration and aids in assuring policy validity. FIG. 3 shows architecture in one embodiment for SCA policy configuration. A Pattern Developer 302 or like may define policy patterns 304 that may comprise role descriptions and constraint descriptions. Each role is a consistent set of policies that need to be applied to an element together, while constraints define valid ways in which roles are applied to an SCA composite. An Assembler or like 306 may apply a policy pattern 304 when he or she assembles a SCA composite 308. Some intents and policySets may be automatically attached to the composite based on the definition of the applied policy pattern. A Deployer 310 or like deploys the pattern-applied SCA composite 308 to SCA runtime 312. If concrete policies are properly deployed, for example, by Policy Deployer 310, the SCA composite 308 is executed with policies. In one embodiment of the present disclosure, the architecture for SCA may comprise a policy pattern for SCA 304, and a top-down policy pattern application mechanism for SCA shown in FIG. 4, a bottom-up policy pattern application mechanism for SCA shown in FIG. 5, and, a policy validation mechanism for SCA shown in FIG. 6.

A Policy Pattern for SCA

In one embodiment of the present disclosure, a policy pattern for SCA 304 may specify policies for SCA elements by associating roles with those elements such as "Transaction creator" role. The role assignment is made if that element is required to behave like a transaction creator. Note that ordinarily this would require assignment of multiple intents and/or policy sets to different elements, but the concept of a role simplifies the policy application. A pattern defines multiple roles and constraints between them. For example, when "roleA" and "roleB" are defined in one pattern, the constraint could be that "roleB" element should be wired from "roleA" element. Here, "wired" means that the element applied "roleA" and the other element applied "roleB" should be connected in a SCA composite. For example, in FIG. 4, the component A and component B are wired, but the component B and the component C ares not wired.

To make deductions about the composite behavior, composite SCA structures, intents, policy sets and policy patterns may be represented in one embodiment in predicate logic. The pattern described above may be defined by the following predicate, which as an example uses Prolog syntax:

patterns :- roleA(X), roleB(Y), constraints(X, Y).

where X and Y are SCA elements which can have policies, such as SCA components, services, and references.

In one embodiment, the following constraints between X and Y are assumed:

$\forall X \exists Y$ path(X, Y).

The predicate path (X, Y) means that SCA element X and Y are wired directly or indirectly. In the SCA composite, if the source element X can invoke the target element Y, path(X, Y) is true. In the SCA pattern, constraints between X and Y is that there is a path from X to Y. And both X and Y have quantifier $\forall, \exists$, so we can represent various kind of constraints for the pattern. The policy pattern may be represented in XML, which is described in more detail below.

The following description explains a top-down policy pattern application mechanism for SCA in one embodiment of the present disclosure. We present two scenarios of pattern application as examples. Here we use an atomic transaction pattern as an example. The atomic transaction pattern may include three roles, txCreator, txPropagator, txNonPropagator. A user can specify atomic transactional policy to a composite by applying these roles in the atomic transaction pattern to the composite. Many applications have a requirement that certain sections of the application execute in an atomic transaction, that is, atomically, wherein the execution either completely succeeds or fails in all situations (thus there is no inconsistency in the final state). Examples of such applications are money transfer, ticket booking and so on. Implementing this requirement in SCA involves application of multiple intents/policy sets to multiple SCA elements. We simplify this by defining an atomic transaction pattern, for example, as follows.

Role definitions: (prolog facts)
 txCreator(X). txPropagator(X). txNonPropagator(X).
Constraints: (prolog rules)
 txCreator(X), txPropagator(Y), path(X, Y).
 txCreator(X), txNonPropagator(Y), path(X, Y).
 not(txNonPropagator (X), txPropagator (Y), path(X, Y)).

Figure 4:
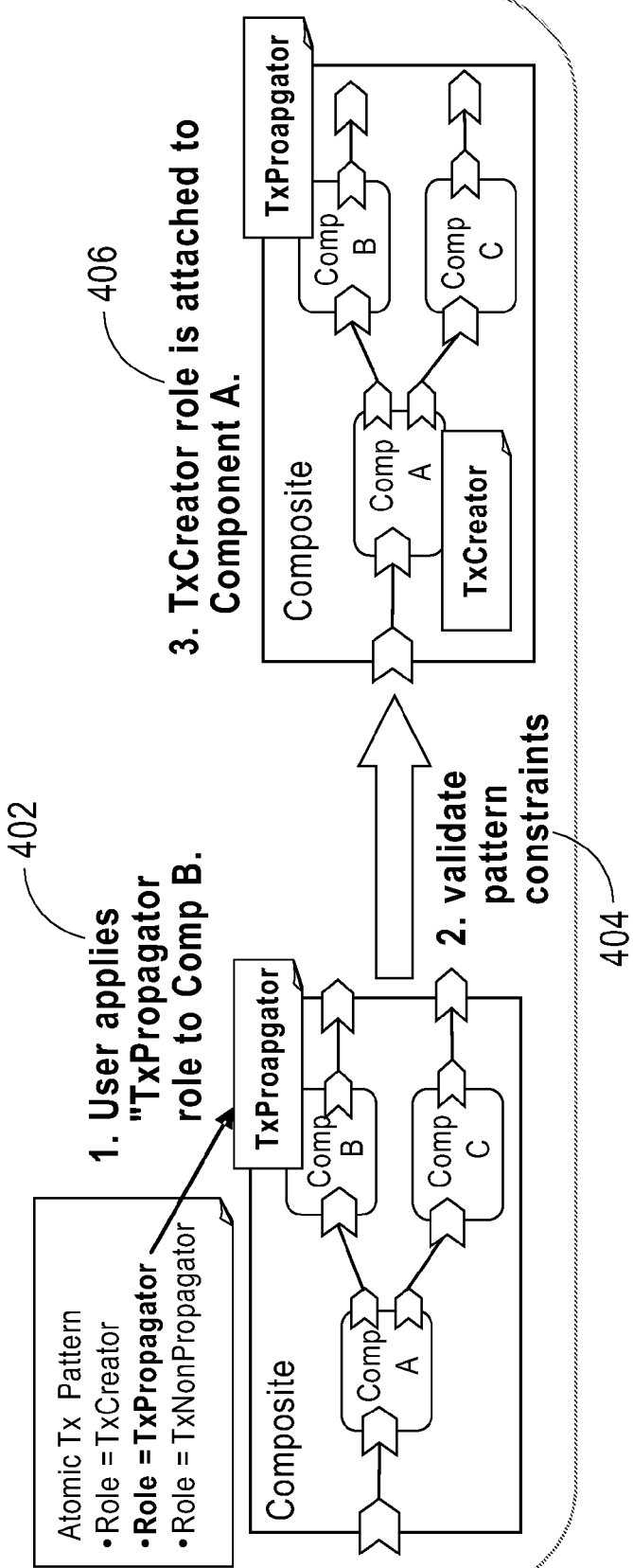
FIG. 4 illustrates top-down pattern application in one embodiment of the present disclosure.

The top-down pattern application scenario assumes that user knows a set of roles defined in the pattern. FIG. 4 illustrates top-down pattern application in one embodiment of the present disclosure. In this case, user can apply a policy by top-down pattern application. At 402, user has the atomic transaction pattern. And he or she selects a role such as "TxPropagator", and applies it to Component B. At 404, the validation of pattern constraints is executed automatically. At 406, "TxCreator" role is attached automatically to Composite A, because the TxPropagator requires a path from the TxCreator according to the pattern constraint as specified in the atomic transaction pattern. For instance, the constraints or relationships between roles are specified in the pattern.

Figure 5:
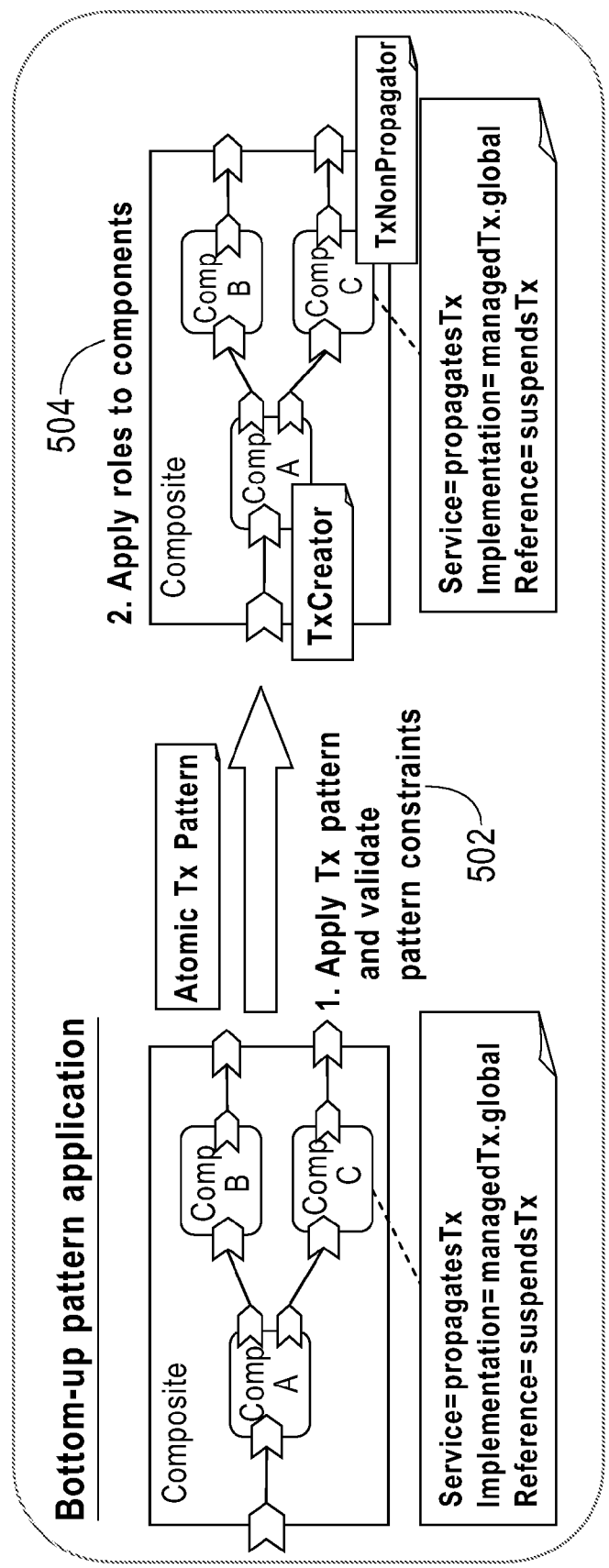
FIG. 5 illustrates bottom-up pattern application.

The following description explains a bottom-up policy pattern application mechanism for SCA in one embodiment of the present disclosure. Another pattern application process, bottom-up pattern application scenario, assumes that user has the pattern to apply. FIG. 5 illustrates bottom-up pattern application. In this case, user can apply policy by bottom-up pattern application. At 502, user applies the atomic transaction pattern to a composite. One or more roles are applied automatically by checking existing policies. Component C has a set of intents, for instance, previously applied by a user manually, such as "propagatesTransaction" intent on Service, "managedTransaction.global" on implementation, and "suspendsTransaction" intent on Reference. This set of intents is defined as "TxNonPropagator" role in the pattern. A role is defined in the pattern by the set of intents. Therefore, "TxNonPropagator" role is applied to Component C. The pattern validation is executed and "TxCreator" role is attached to Composite A, because the TxNonPropagator requires a path from the TxCreator according to the pattern constraint. In the above example, the constraint is defined in the pattern, and the pattern is predefined by a developer or user, for instance, who has a security expertise.

Figure 6:
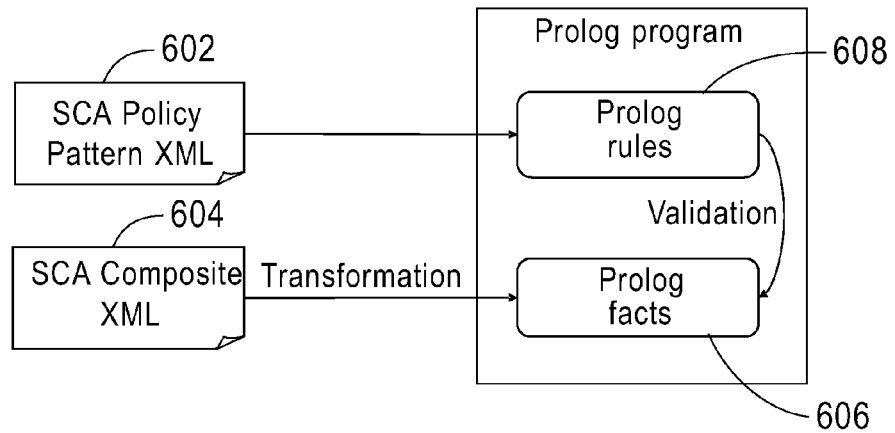
FIG. 6 illustrates policy pattern validation.

A policy validation mechanism for SCA in one embodiment is described below. The present disclosure also proposes how to validate a pattern in both a top-down and a bottom-up application. FIG. 6 illustrates policy pattern validation. In one embodiment of the present disclosure, policy pattern is represented as XML 602, and defined based on predicates, therefore they can be used as prolog rules. The validation mechanism example shown in FIG. 6 is based on a prolog program, which comprise the following parts:

1. prolog facts 606 which are transformed from a SCA composite representation 604 (SCDL—Service Component Definition Language);
2. prolog rules 608 which are transformed from the pattern XML representation 602.

In the present disclosure, we define patterns that capture nonfunctional behavior at a high level, instead of relying on individual policies. The patterns may be represented in XML, although not limited to that representation. Validation mechanism of the present disclosure uses an inferencing engine. A programming language such as Prolog provides that capability and can be used. If Prolog is not used, other language constructs that provide inferencing mechanism may be used, or an inferencing engine may be built for that functionality.

In one embodiment of the present disclosure, to validate a SCA composite written in XML representation 604, it is transformed into prolog facts 606. We define the transformation from a SCDL into corresponding prolog facts. An example of transformed prolog facts is as follows:

component(CompA).
componentService(CompAServ).
componentReference(CompARef).
hasIntent(CompAServ, [integrity]).

The component(CompA) specifies a component named "CompA". The componentService(CompAServ) and componentReference(CompARef) specify a service and reference on a component, respectively. If the CompAServ has an integrity intent, its predicate is hasIntent(CompAServ, [integrity]).

The policy pattern also may be XML representation as shown at 602, and the pattern can be transformed into the prolog rules 608. The pattern-applied component should satisfy the following constraints: $\forall X \exists Y$ (path(X,Y), roleA(X), roleB(Y)).

In top-down pattern application, one or more roles may be applied to a composite by a user and it can be transformed into corresponding prolog facts. The prolog facts and the prolog rules which is derived from the pattern can be executed automatically as a prolog program. If the facts satisfy the rules, the program returns true and this means that the role-applied composite does not violate the pattern constraints. If the program returns false, the policies should be altered to conform the pattern. A user may be notified to change the policies. In bottom-up pattern application, one or more roles are inferred (i.e., if the proper set of intents are applied to a composite, those intents are transformed into the corresponding roles by the inference) and applied when a user selects the pattern applied to a composite. The validation process may be executed as the case of top-down application.

As described above, a SCA composite comprises of SCA elements such as components, services, and references. A SCA component contains the actual business logic and contributes to the functionality provided by the SCA composite. The component's business logic is coded and exposed for use by other components and clients in the developer's preferred implementation platform (SCA supports the use of multiple such implementation technologies) The component implementation could itself be another SCA composite, creating a recursive structure: the component is implemented by another composite, and the composite has other components.

Figure 7:
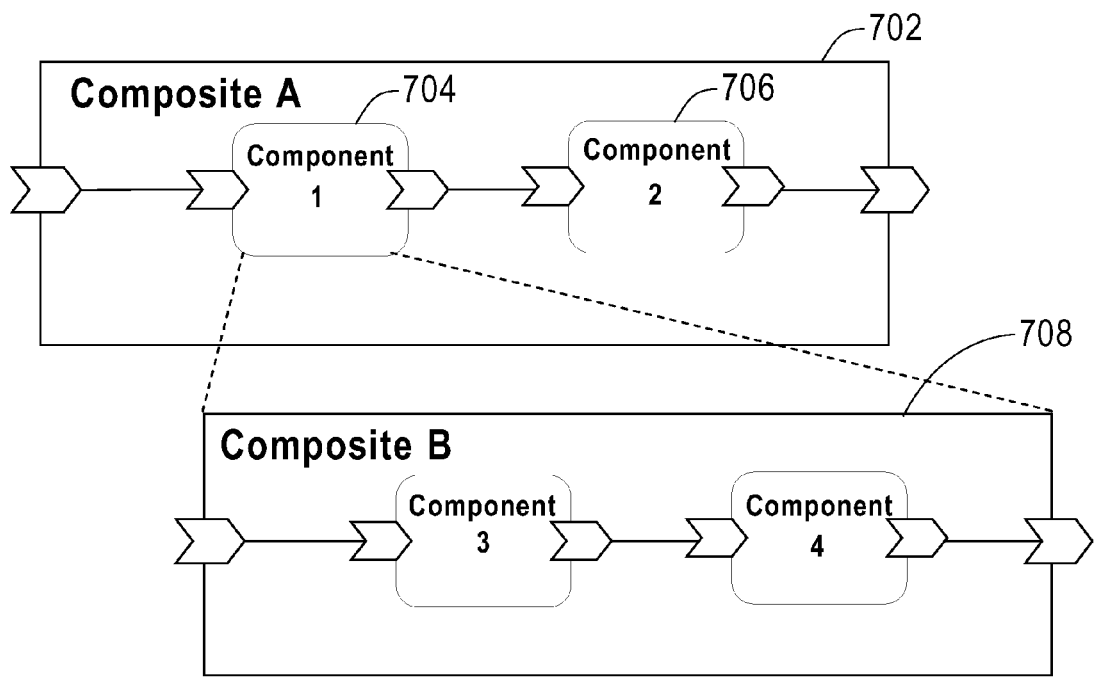
FIG. 7 shows an example of a composite.

FIG. 7 shows and example of a composite. Composite A 702 has two components, components 1 and 2, 704 and 706, and component 1 (704) is implemented by another composite B 708. The composite B 708 has some components inside it, therefore component 1 (704) has recursive structure.

Figure 8:
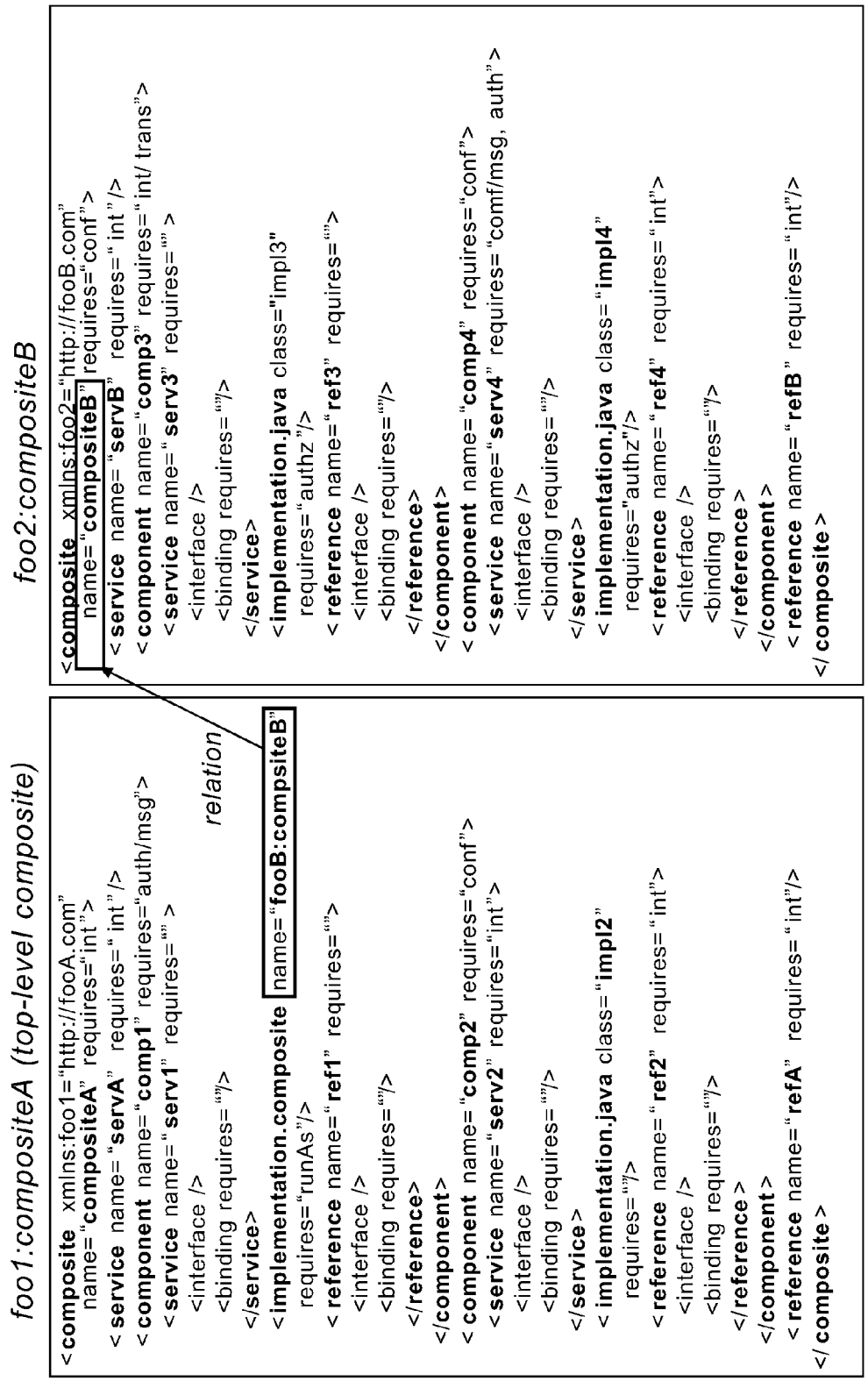
FIG. 8 illustrates XML representation of recursive composite in FIG. 7.

FIG. 8 illustrates XML representation of recursive composite in FIG. 7. FIG. 8 is referred to as SCDL. One SCDL represents one composite. Hence there are two SCDLs corresponding to the recursive SCA composite shown in FIG. 7. These SCDLs have a relation by name attribute value of <implementation.composite> element in the SCDL of top-level composite.

SCA policy can be applied to any SCA elements, so policies can be added to a top-level composite and also a lower composite, which is used in the top-level composite. If both a top-level and lower composites have policies, they are merged and checked if the set of policies are valid. However, the validation rule gets complex because there may exist domain-specific constraints for policies. As for transaction policy intent, valid set of transaction intents are defined as propagatesTransaction on component service and component reference, and managedTransaction.global on component implementation. However, a set of propagatesTransaction on component service and managedTransaction.local on component implementation is invalid, for instance, because the SCA specification defines that they are invalid. In cases where the composite has recursive structure, it will be hard to ensure all applied intents are valid because intents on a higher component (e.g., composite 1 shown in FIG. 7) influence the lower components (composite B and inner elements shown in FIG. 7). The present disclosure proposes defining policy patterns and a method in one embodiment for applying the policy patterns to a component by using inference engine such as Prolog inference.

The method and system of the present disclosure may define a policy pattern for SCA. Details of a policy pattern for SCA are further described herein. A SCA policy pattern comprises a definition of roles and a definition of constraints for roles. The mechanism of the present disclosure in one embodiment can apply a valid set of policy intents by applying one role to a SCA element. A role is an abstraction of SCA element properties, and it is defined as a valid set of SCA policy and elements. The following is one example of role for transaction policy pattern. A "txCreator" role can be defined as follows:

```
txCreator(X) :-    componentService(X, Serv),
                   hasSuspendsTx(Serv),
                   componentReference(X, Ref),
                   hasPropagatesTx(Ref),
```

-continued

```
componentImplementation(X, Impl),
hasManagedTxGlobal(Impl).
```

Here "X" is an SCA element, and componentService(X, Serv) means that "X" is SCA component and "Serv" is a service of the component. The hasSuspendsTx(Serv) means that "Serv" has a transaction policy intent "suspendsTransaction". Similarly, hasPropagatesTx(Ref) and hasManagedTx-Global(Impl) means that a component reference and implementation have "propagatesTransaction" and "managedTransaction.global" intents, respectively. In the present disclosure, a user can apply policies to SCA components by assigned the role. A component which is assigned "txCreator" role is assumed to have these three transaction intents on the corresponding elements.

In one embodiment of the present disclosure, we define the role representation in XML. This representation is based on a SCDL representation. We introduced a "role" element, and this element has properties for the role. Table 1 illustrates representation of "txCreator" role and its properties by component structure.

TABLE 1

Role representation based on a component template

```
<pat:role name="txCreator" max="unbounded" min="0">
  <sca:component>
    <sca:service name="txCreatorSv" requires="suspendsTranscation"/>
    <sca:implementation.java requires="managedTranscation.global"/>
    <sca:reference name="txCreatorRef"
    requires="suspendsTransaction"/>
  </sca:component>
</pat:role>
```

We can specify one or more types of roles in one pattern, and constraints between roles can be specified as a pattern. To represent patterns, we introduce a concept of "path" in a composite.

Definition of Path

Figure 9:
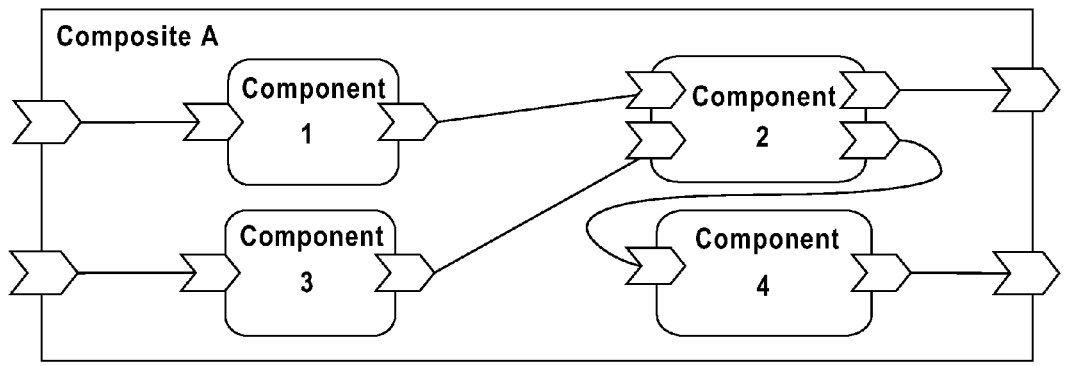
FIG. 9 illustrates a composite that has four parts.

In the SCA composite, some elements may be assembled and wired to each other. FIG. 9 illustrates a composite that has four parts. Component 2 (904) is wired with Component 1 (902), therefore it can be invoked by Component 1 (902). Component 3 (906) is wired with Component 2 (904) and Component 2 (904) is wired with Component 4 (908). In the present disclosure, such possible invocation links are referred to as a path in one composite. If two components are wired directly or indirectly in a composite, we define that they are on a same path in the composite. For instance, component 1, component 2, component 4 are on the same path. Similarly, component 3, component 2 and component 4 are on the same path. Our proposed pattern can specify constraints for a required and restricted path of roles-applied elements.

As for transaction policy, the mechanisms of the present disclosure defines txCreator and txPropagator roles, and the pattern constraints can be represented as follows:

$$\forall Y \exists X (path(X, Y), txCreator(X), txPropagator(Y)).$$

This predicate means that X is a component applied to a txCreator role and Y is another component applied to a txPropagator role, and all Y should be connected to existing X directly and indirectly. The XML representation of this pattern rule is shown in Table 2 below. Path(X, Y) can be represented as <pat:Path sourceRole="X" targetRole="Y"/>. Quantifiers of X and Y such as $\forall Y \exists X$ corresponds to <pat:AllTargets><pat:ExistSource> elements. In one example constraint representation, four quantifier elements are introduced as follows:

<AllSources>:=$\forall X$

<ExistSource>:=$\exists X$

<AllTargets>:=$\forall Y$

<ExistTarget>:=$\exists Y$

Also <pat:All>, <pat:Or> corresponds to logical operations.

TABLE 2

Pattern constraint representation in XML

```
<pat:constraints>
  <pat:All>
    <pat:AllTargets>
      <pat:ExistSource>
        <pat:path sourceRole="txCreator" targetRole="txPropagator"/>
      </pat:ExistSource>
    </pat:AllTargets>
    <pat:AllTargets>
      <pat:ExistSource>
        <pat:path sourceRole="txCreator"
        targetRole="txNonPropagator"/>
      </pat:ExistSource>
    </pat:AllTargets>
    <pat:AllSources>
      <pat:AllTargets>
        <pat:notpath sourceRole="txNonPropagator"
        targetRole="txPropagator"/>
      </pat:AllTargets>
    </pat:AllSources>
  </pat:All>
</pat:constraints>
```

The policy pattern in one embodiment comprises the role definition and pattern constraints represented in XML. Table 3 shows a part of transaction pattern example. We assume that a pattern is applied to one composite, so the compositePattern element is a template of a composite structure. The pattern specifies a set of policy intents and policySets as component roles. The component element in the compositePattern is assigned a role name by role attribute, and one or more intents are specified as the component and its child elements (service, reference and implementation). This example shows that a component that is assigned a "txCreator" role should have the following intents: "suspendsTranscation" intent on a service element, "managedTranscation.global" intent on an implementation element, and "propagatesTransaction" intent on a reference element.

The constraints element specifies constraints of component roles. We can specify two roles, which are allowed to connect directly and indirectly using path element. For example, the pattern specifies the constraints between two roles. In one embodiment, the constraint exists between what is identified as the 'sourceRole' and 'targetRole'. Using the All/Exists quantifiers allows for specifying how many respective sources are present for the respective targets. The path/nopath allows for specifying whether the source and target should be connected or not. The source and target element means that there is a path from an element with source role to another element with target role. These source and target roles have quantifiers specified by AllTargets and ExistSource elements. The All element is a logical operator for multiple paths.

In one embodiment of the present disclosure, policy intents and policySets can be applied properly by applying roles to components. The role application may be validated according to the constraints.

TABLE 3

Policy Pattern Representation Example

```
<pat:policyPattern patternName="AtomicTransactionPattern"
   xmlns:pat=http://www.research.ibm.com/sca/policypattern" ....>
 <pat:compositePattern policySets="" requires="">
  <pat:role="txCreator" max="unbounded" min="0">
    <sca:component>
      <sca:service name="txCreatorSv" requires="suspendsTranscation"/>
         <sca:implementation.java requires="managedTranscation.global"/>
         <sca:reference name="txCreatorRef" requires="propagatesTransaction"/>
    </sca:component>
  </pat:role>
  <pat:role="txPropagator" max="unbounded" min="0">
    <sca:component>
      <sca::service name="txPropagatorSv" requires="propagatesTranscation"/>
         <sca::implementation.java requires="managedTranscation.global"/>
         <sca::reference name="txPropagatorRef" requires="propagatesTransaction"/>
    </sca::component>
  </pat:role>
 ....
 <pat:constraints>
   <pat:All>
    <pat:AllTargets>
       <pat:ExistSource>
         <pat:path sourceRole="txCreator" targetRole="txPropagator"/>
       </pat:ExistSource>
    </pat:AllTargets>
   </pat:All>
   ......
 </pat:constraints>
 </pat:compositePattern>
</pat:policyPattern>
```

Top-Down and Bottom-Up Policy Application and Validation

An SCA composite is represented in XML as SCDL, and the policy pattern has also XML representation. Policies may be applied in several ways according to the present disclosure. For example, as discussed above, top-down and bottom-up applications. In the top-down application, a user knows the roles, which are defined in the pattern, and he or she may apply the roles to SCA elements manually, for example, via user input on a user interface tool or program running on a computer or computer system. The applied roles are automatically checked if they are valid based on the pattern constraints, and other required roles are inferred and assigned automatically.

As for the bottom-up application, a user has a composite with one or more policies, and roles are inferred from existing policies. The set of intents are defined as a role in the pattern, and this information is used in the inference. The pattern constraints are validated as the case of a top-down application.

In one embodiment, a policy pattern is designed by predicate logic, therefore we can validate the pattern, for instance, by using a program that uses predicate logic such as a Prolog program. An SCA composite is also represented in XML, and the SCDL is transformed into as Prolog facts. The policy pattern may be regarded as the Prolog rules, so the facts can be validated by the pattern. That is, the pattern XML representation is transformed into the Prolog rules and they are used by the inference automatically.

Figure 10:
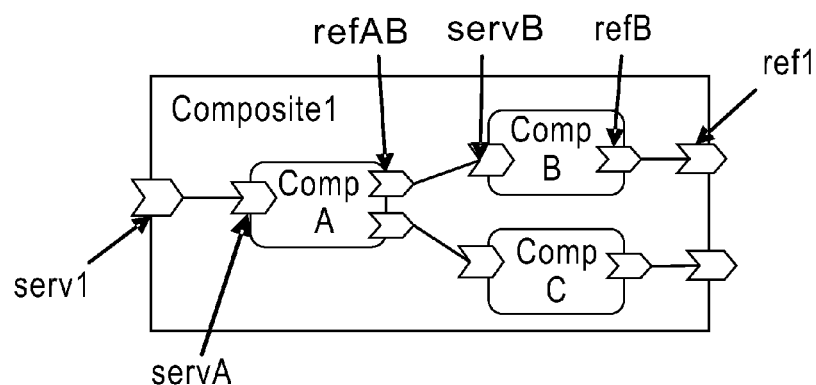
FIG. 10 illustrates a composite transformed to prolog facts.

The following example transforms the SCDL into the Prolog facts. FIG. 10 illustrates a composite transformed to Prolog facts. The following is predicates to represent the SCA composite structure. The following composite A is transformed as follows:

```
// composite 1
composite(composite1).
compositeService(composite1, serv1).
compositeReference(composite1, ref1).
// component A
component(composite1, compA).
componentService(compA, servA).
componentReference(compA, refAB).
componentImplementation(compA, compAimpl).
// component B
component(ccomposite1, compB)
... (abbreviated)
// wires in the composite
wire(serv1, servA).
wire(refAB, servB).
```

The composite 1 in FIG. 10 is transformed into composite (composite1), compositeService(composite1, serv1), and compositeReference(composite1, ref1). The other SCA elements are transformed into the corresponding predicate in the same way.

To apply a transaction pattern to the composite A by top-down application, a user applies roles, and they are transformed into Prolog facts (e.g., txPropagator(compB)). Other required roles are inferred based on the pattern constraints by the predicate:

atomicTransaction(X, Y) :- txCreator(X), txPropagator (Y), constraints(X, Y), constraints(X, Y) :- path(X, Y), where X and Y are SCA component, and they should be on the same path. In this example, component A is inferred as a txCreator because it is wired to component B.

In case bottom-up application, a user applies patterns, and roles are inferred and assigned from existing intents. Assigned roles are transformed into prolog facts (e.g., txNonPropagagtor(compC)). Other required roles are inferred based on the pattern constraints specified in atomicTransaction(X,Y). The second and third steps may be the same as the top-down application.

Support for Recursive Composite

SCA elements are connected by wire, so they can be transformed into the Prolog facts. Here we have three types of wires, which are defined in the SCA specification:

promotionWire(X, Y) :- compositeService(Comps, X), componentService(Comp, Y).
promotionWire(X, Y) :-componentReference(Comp, X), compositeReference(Comps, Y).
connectionWire(X, Y) :- componentReference(SourceComp, X), componentService(TargetComp, Y).
projectonWire(X, Y) :- componentService(Comp, X), compsiteService(Comps, Y).
projectonWire(X, Y) :- compositeReference(Comps, X), componentReference(Comp, Y).

The promotionWire(X,Y) is a wire to connect a composite and an inner component. The connectionWire(X,Y) connects components in the composite. Additionally, we introduced the projectionWire(X,Y) which connects a higher component and a lower composite in a recursive case. We assume that these wires are equal in the composite. So by using projectionWire, we can transform the recursive composite into prolog facts or like as same as a flat composite. The policy pattern application and validation mechanism can be also applied to the recursive composite.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented pattern-based policy method for service component architecture (SCA), comprising:
defining a policy pattern for SCA, said policy pattern including a definition of a plurality of roles and a definition of one or more constraints between said plurality of roles as a pattern, each of said plurality of roles being a characteristic of SCA component properties and defined as a plurality of intents or policy sets or combination thereof, said one or more constraints specifying how said plurality of roles participating in the policy pattern are connected in a component assembly;
identifying one or more roles assigned to said one or more SCA components;
applying automatically, by a processor, one or more intents or policy sets or combination thereof, associated with said one or more roles to said one or more SCA components; and
validating said one or more intents or policy sets or combination thereof applied to said one or more SCA components based on said one or more constraints.

2. The method of claim 1, wherein said applying includes inferring one or more roles from said one or more constraints and applying automatically said inferred one or more roles.

3. The method of claim 1, further including:
allowing a user to assign one or more roles to said one or more SCA components.

4. The method of claim 1, further including:
allowing a user to select a policy pattern to apply; and
attaching one or more roles associated with the user selected policy pattern to said one or more SCA components.

5. The method of claim 4, further including:
inferring one or more roles from said one or more constraints and applying automatically said inferred one or more roles.

6. The method of claim 1, further including:
transforming said one or more constraints to a predicate-based language.

7. The method of claim 6, wherein the predicate-based language includes Prolog.

8. The method of claim 1, further including:
transforming said one or more roles into a predicate-based language.

9. The method of claim 8, wherein the predicate-based language includes Prolog.

10. A computer-implemented pattern-based policy method for service component architecture (SCA), comprising:
defining a policy pattern for SCA, said policy pattern including a definition of a plurality of roles and a definition of one or more constraints between said plurality of roles, each of said plurality of roles being a characteristic of SCA component properties and defined as a plurality of intents or policy sets or combination thereof, said one or more constraints specifying how said plurality of roles participating in the policy pattern are connected in a component assembly;
allowing a user to select a policy pattern to apply for a composite including one or more SCA policies;
inferring one or more roles based on the policy pattern applied for said composite;
attaching said one or more roles to said one or more SCA components;
inferring one or more roles from said one or more constraints and applying automatically, by a processor, said inferred one or more roles; and
validating said one or more intents or policy sets or combination thereof applied to said one or more SCA components based on said one or more constraints.

11. The method of claim 10, further including:
transforming said one or more constraints to a predicate-based language.

12. The method of claim 11, wherein the predicate-based language includes Prolog.

13. The method of claim 10, further including:
transforming said one or more roles into a predicate-based language.

14. The method of claim 13, wherein the predicate-based language include Prolog.

15. A system for pattern-based policy application for service component architecture (SCA), comprising:
a processor;
a computer-implemented module operable to define a policy pattern for SCA, said policy pattern including a definition of a plurality of roles and a definition of one or more constraints between said plurality of roles, each of said plurality of roles being a characteristic of SCA component properties and defined as a plurality of intents or policy sets or combination thereof, said one or more constraints specifying how said plurality of roles participating in the policy pattern are connected in a component assembly;
a computer-implemented module operable to identify one or more roles assigned to said one or more SCA components;
a computer-implemented module operable to apply automatically one or more intents or policy sets or combination thereof, associated with said one or more roles to said one or more SCA components; and
a computer-implemented module operable to validate said one or more intents or policy sets or combination thereof applied to said one or more SCA components based on said one or more constraints.

16. The system of claim 15, wherein said a computer-implemented module operable to apply automatically one or more intents or policy sets or combination thereof, further is operable to infer one or more roles from said one or more constraints and applies automatically said inferred one or more roles.

17. The system of claim 15, wherein the system is further operable to allow a user to assign one or more roles to said one or more SCA components.

18. The system of claim 15, wherein the system further includes a computer-implemented module that allows a user to select a policy pattern to apply for a composite including one or more SCA policies, and further infers one or more roles based on the policy pattern applied for said composite and attaches said one or more roles to said one or more SCA components.

19. A non-transitory program storage device readable by a machine, tangibly embodying a program of instructions executable by the machine to perform a method of pattern-based policy application for service component architecture (SCA), comprising:
defining a policy pattern for SCA, said policy pattern including a definition of a plurality of roles and a definition of one or more constraints between said plurality of roles, each of said plurality of roles being a characteristic of SCA component properties and defined as a plurality of intents or policy sets or combination thereof, said one or more constraints specifying how said plurality of roles participating in the policy pattern are connected in a component assembly;
identifying one or more roles assigned to said one or more SCA components;
applying automatically one or more intents or policy sets or combination thereof, associated with said one or more roles to said one or more SCA components; and
validating said one or more intents or policy sets or combination thereof applied to said one or more SCA components based on said one or more constraints.

20. The program storage device of claim 19, wherein said applying includes inferring one or more roles from said one or more constraints and applying automatically said inferred one or more roles.

21. The program storage device of claim 19, further including:
allowing a user to assign one or more roles to said one or more SCA components.

22. The program storage device of claim 19, further including:
allowing a user to select a policy pattern to apply; and
attaching one or more roles associated with the user selected policy pattern to said one or more SCA components.

23. The program storage device of claim 22, further including:
inferring one or more roles from said one or more constraints and applying automatically said inferred one or more roles.

24. The program storage device of claim 19, further including
allowing a user to select a policy pattern to apply for a composite including one or more SCA policies;
inferring one or more roles based on the policy pattern applied for said composite; and attaching said one or more roles to said one or more SCA components.

* * * * *